R. B. DONALDSON,

Assignor to S. S. WHITE.

Dental-Plugger.

No. 8,763. Reissued June 17, 1879.

WITNESSES

Wm A. Skinkle.

Geo W Brick

INVENTOR

Robert B. Donaldson.

By his Attorneys

Baldwin, Hopkins & Peyton.

N. PETERS, PHOTO-LITHOGRAPHER, WASHINGTON, D. C.

UNITED STATES PATENT OFFICE.

ROBERT B. DONALDSON, OF WASHINGTON, DISTRICT OF COLUMBIA, ASSIGNOR TO SAMUEL S. WHITE, OF PHILADELPHIA, PA.

IMPROVEMENT IN DENTAL PLUGGERS.

Specification forming part of Letters Patent No. 161,393, dated March 30, 1875; Reissue No. 8,763, dated June 17, 1879; application filed May 6, 1879.

*To all whom it may concern:*

Be it known that I, ROBERT B. DONALDSON, of Washington city, in the District of Columbia, have invented certain new and useful Improvements in Plugging-Instruments for Dentists' Use, of which the following is a specification.

My invention relates to instruments for impacting gold and other fillings in the cavities of teeth, and for other similar uses, commonly called "dental pluggers;" and consists of certain new constructions and combinations of devices, which are pointed out at the close of this specification.

The object of my invention is to provide a mechanical dental plugging-instrument capable of imparting to the plugging "point" or tool a series of positive hammer-like blows in rapid succession, while at the same time being simple, efficient, and easily manipulated.

The said instrument comprises in its structure a handle or casing, in which is mounted a plugger-stock or tool-holder carrying the plugging point or tool; a revolving hammer having the capacity of imparting to the tool-stock positive hammer-like blows in rapid succession; a spring which presses the tool-stock toward the hammer to maintain it in, or return it to, a position to receive the blows therefrom; and a shaft or shank which adapts the instrument to be driven by the rotary tool chuck or holder of a dental engine, said shaft being inserted and locked in the socket of said rotary chuck in well-known ways.

Figure 1:
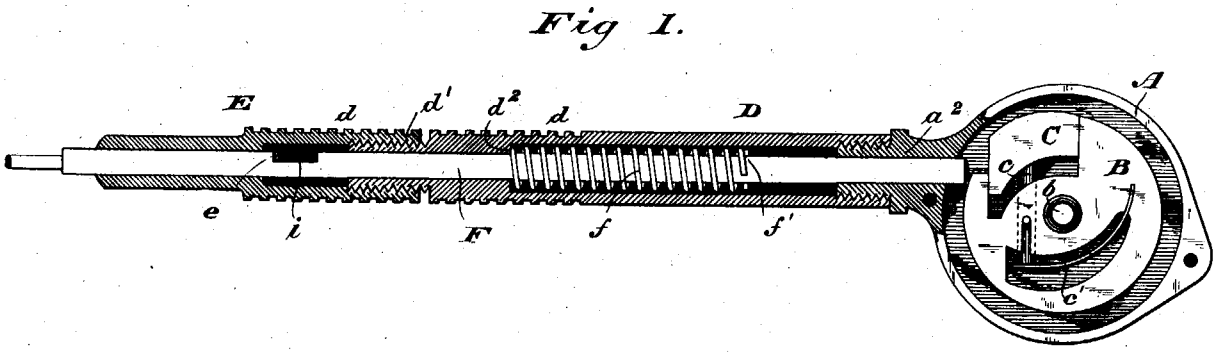
Figure 2:
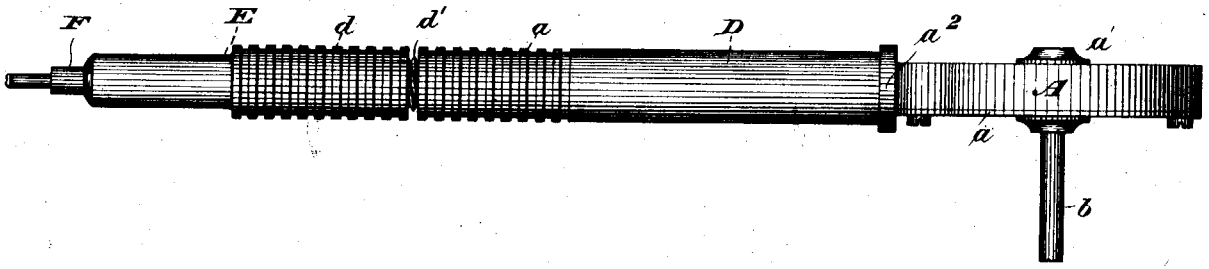

In the accompanying drawings, Figure 1 represents a longitudinal section through my improved instrument as organized in the best way known to me at the date of my original patent, and Fig. 2 a plan or top view thereof.

A flat cylindrical casing or frame, A, having a cap or cover, *a*, suitably secured thereto —as, for instance, by screws—surrounds or affords bearings at each side for the shaft or journals *b* of a rotating disk or wheel, B. This shaft passes centrally through the casing A from side to side, being supported at its inner end in a box or cavity in a boss, $a^1$. To the outer end of the shaft *b*, which projects from the frame or casing A, is applied the driving-power, derived, by preference, from the rotary tool-chuck of a dental engine, in the socket of which the shaft *b* is inserted and locked, so as to be turned or revolved by said tool-chuck.

In the periphery of the disk or wheel B is a recess or groove, in which is fitted a round-faced hammer or projection, C, the said disk and its projection thus constituting a revolving hammer. The hammer or projection is shown as attached to one end of a rod or pin, *c*, the opposite extremity of which is fixed to a spring, *c'*, fitted in a recess in the disk or wheel, the tension of the spring being exerted to throw or force the hammer or projection a short distance beyond the circumference of the disk, the said disk and hammer thus constituting a revolving spring-hammer.

To a tubular portion, $a^2$, of the frame or casing A is secured (by screw-threads) the tubular handle portion or casing of the instrument, which is constructed preferably of two sections, D E. This tubular casing is provided on its external surface or periphery with a series of circumferential grooves, ribs, or shoulders, *d*, to adapt the casing to be easily and firmly held with a light grasp of the fingers, and has a smooth internal surface or bearing for the reception of a plugger-stock or tool-holder, F, which is shown as extending entirely through said casing, projecting at its rear or butt end a short distance into the frame or casing A, to receive the impact or blow of the revolving hammer, while at its front end it is provided with a socket, in which is inserted, in the ordinary manner, the plugging-point or operating-tool.

The shaft or journal upon which the hammer is mounted, it will be observed, is arranged crosswise of the longitudinal axis of the plugger-stock, whereby the projection or hammer on the periphery of the revolving disk or wheel is enabled to act directly upon the plugger-stock in giving its blows.

It will be noticed that the tubular handle-casing is secured to the hammer frame or casing not in the line of the radius of said hammer-casing, but at an angle to the radius, as shown in Fig. 1. This angle I have found by trial to be the one at which the hammer gives the most direct and positive blow upon the head of the tool-stock, avoiding the lateral jar and lost power which would result if the tubular casing were inserted in the frame or casing A on the line of the radius or a tangent.

The two tubular sections D E of the handle-casing are connected together by screw-threads at $d^1$. Within the enlarged bore of the section D of this casing, and surrounding the stock or tool-holder F, is a spiral spring, *f*, one end of which bears or rests against a shoulder, $d^2$, of the section D, while the opposite end acts against a pin, $f'$, passing transversely through the stock. The expansive force of this spring is exerted to throw or press the head or butt end of the plugger-stock, which is fitted and guided at its rear end in the tubular portion $a^2$ of the casing A, a short distance into said casing, to receive the impact or blows of the hammer, and after each actuation of said stock by the hammer to return it to a position to receive the next blow, the said spring being a well-known instrumentality for this purpose in dental plugging-instruments.

The plugger-stock is held in the tubular section E by means of a transverse pin, *e*, the stock being notched or recessed, as at *i*, for its reception, as shown in Fig. 1. The tension or force of the returning-spring *f*, which is slight, holds the lower side or shoulder of the notch or recess in the stock lightly in contact with the pin *e* until the blow of the hammer is given.

The force of the blow of the hammer depends upon the distance the upper or butt end of the plugger-stock projects into the hammer frame or casing, or, in other words, upon the distance of the butt end or head of the stock from the revolving hammer, and this is regulated by adjusting the tubular section E, which carries the pin *e*, upon the section D of the handle-casing, whereby the said casing is lengthened or shortened, and the pin *e* brought nearer to or farther from the said hammer, thus governing or regulating, by the shoulder on the stock, the degree of projecture of said stock into the hammer-casing, or the distance between the hammer and the butt-end of said stock.

By turning the section E relatively to section D while operating, the dentist or operator has complete control over the force of the blow given or transmitted to the operating point or tool.

I claim as my invention—

1. The combination, substantially as hereinbefore set forth, of the plugger-stock or tool-holder with the revolving hammer, to impart positive blows thereto in rapid succession.

2. The combination, substantially as hereinbefore set forth, of the plugger-stock or tool-holder, the revolving hammer, and the spring, to return the stock or holder to its position in readiness for the next blow after each actuation thereof by the hammer.

3. The combination, substantially as hereinbefore set forth, of the handle, the plugger-stock or tool-holder, the revolving hammer or disk, its frame or casing, and the shaft or journal upon which the hammer is mounted, arranged crosswise of the longitudinal axis of the plugging-stock or holder.

4. The combination, substantially as hereinbefore set forth, of the handle, the plugger-stock or tool-holder, the revolving hammer or disk, its frame or casing, the shaft or journal upon which the hammer is mounted, arranged crosswise of the longitudinal axis of the plugger-stock or tool-holder, and the spring to return said stock after each actuation thereof by the hammer.

5. The sectional tubular casing in which the plugger-stock moves endwise, in combination with the revolving hammer and its frame or casing.

6. The combination, substantially as hereinbefore set forth, of the revolving hammer with a plugger or tool stock adjustable endwise relatively to said hammer to regulate the blow.

7. The combination, substantially as hereinbefore set forth, of the revolving hammer with a plugger or tool stock adjustable endwise relatively to said hammer to regulate the blow, and a spring to return the stock after each actuation thereof by said hammer.

8. The combination, substantially as hereinbefore set forth, of the revolving disk and spring-hammer carried thereby (constituting a revolving spring-hammer) with the plugger-stock actuated thereby.

9. The combination, substantially as hereinbefore set forth, of the handle, the plugger-stock or tool-holder, the returning-spring acting thereon, the adjusting devices, the revolving hammer, relatively to which the plugger-stock is adjusted, the shaft or journals of said hammer, the frame or casing thereof, and the driving-shaft, which forms the connection between the hammer and the motive power.

ROBERT B. DONALDSON.

Witnesses:

H. M. SCHOOLEY,

WM. J. PEYTON.